US006971909B2

(12) United States Patent
Levesque et al.

(10) Patent No.: US 6,971,909 B2
(45) Date of Patent: Dec. 6, 2005

(54) ANGLED PATCH PANEL ASSEMBLY

(75) Inventors: Stewart A. Levesque, Scotland, CT (US); Lars R. Larsen, Old Lyme, CT (US)

(73) Assignee: Ortronics, Inc., New London, CT (US)

( * ) Notice: Subject to any disclaimer, the term of this patent is extended or adjusted under 35 U.S.C. 154(b) by 7 days.

(21) Appl. No.: 10/748,604

(22) Filed: Dec. 30, 2003

(65) Prior Publication Data

US 2005/0142932 A1 Jun. 30, 2005

(51) Int. Cl.⁷ .................. H01R 35/00; H01R 13/60; H01R 13/66; G02B 6/38; G02B 6/00
(52) U.S. Cl. .................. 439/540.1; 439/533; 385/55; 385/134
(58) Field of Search .................. 439/540.1, 533; 385/55, 134

(56) References Cited

U.S. PATENT DOCUMENTS

| | | | |
|---|---|---|---|
| 4,824,196 A | 4/1989 | Bylander | |
| 4,995,688 A | 2/1991 | Anton et al. | |
| RE34,955 E | 5/1995 | Anton et al. | |
| 6,293,707 B1 | 9/2001 | Wild | |
| RE37,489 E | 1/2002 | Anton et al. | |
| 6,537,106 B1 * | 3/2003 | Follingstad | 439/534 |
| 2003/0022552 A1 | 1/2003 | Barker et al. | |
| 2004/0209515 A1 * | 10/2004 | Caveney et al. | 439/540.1 |

OTHER PUBLICATIONS www.panduit.com/products, Panduit Product Information, Copyright 1995–2003, 2 pages.
DP6 Plus Angled Patch Panel Customer Drawing.
Panduit product literature, DP6 PLUS Patch Panels.
Panduit product literature, DP6 PLUS Component Test Data.
Ortronics product literature, The Complete Guide to Structured Cabling Systems, 1999, 2 pages.
Ortronics product literature, 1997–98 Full Line System Solutions Catalog, 2 pages.

* cited by examiner

Primary Examiner—Chandrika Prasad
(74) Attorney, Agent, or Firm—McCarter & English, LLP

(57) ABSTRACT

An angled patch panel is provided that is configured to be mounted to a rack or console. The angled patch panel facilitates cable management functions and enhances space utilization at and around the rack/patch panel assembly. The angled patch panel includes first and second patch panel elements that are angularly oriented with respect to each other. The transition from the first patch panel element to the second patch panel element is generally achieved in an apex region. The angled patch panel also includes flange members that extend from the first and second patch panel elements. Each of the flange members define a mounting face and an extension arm that is intermediate the mounting face and the patch panel element. The extension arm is dimensioned to facilitate at least partial recessing of the angled patch panel relative to the rack/console when the angled patch panel is mounted thereto.

20 Claims, 3 Drawing Sheets

ANGLED PATCH PANEL ASSEMBLY

BACKGROUND OF THE DISCLOSURE

1. Technical Field

The present disclosure relates to an advantageous patch panel assembly and, more particularly, to an angled patch panel assembly that is configured to be mounted to a rack or console, facilitates cable management functions, and enhances space utilization.

2. Discussion of Background Art

Patch panels are well known in the field of data communication systems. A patch panel generally provides a plurality of network ports incorporated into a single structural element that connect incoming and outgoing lines of a local area network (LAN) or other communication, electronic or electrical system. Patch panels are usually housed within a telecommunications closet or in an alternative location appropriate for patching cables. Typical patch panels are mounted hardware units that include a plurality of port locations (e.g., twenty four or forty eight) that function as a sort of static switchboard, using cables to interconnect computers associated with a LAN and/or to connect computers to an outside network, e.g., for connection to the Internet or other wide area network (WAN). A patch panel generally uses a sort of jumper cable, called a patch cord, to create each interconnection.

In a typical installation, the patch panel connects a network's computers to each other and to the outside lines that enable the LAN to connect to the Internet or another WAN. Connections are generally made with patch cords and the patch panel allows circuits to be easily and efficiently arranged and rearranged by plugging and unplugging the patch cords. Patch panel systems are generally intended to facilitate organization and management in implementing telecommunications wiring systems, e.g., for high speed data networks.

Patch panels are routinely mounted between rack elements so as to permit wires or cables, e.g., unshielded twisted pair (UTP) cables, to be wired to IDCs positioned at the rear face of the patch panel, and to further permit patch plugs to be plugged into jacks or ports positioned in the front face of the patch panel. Typical patch panels are substantially planar, extending horizontally from rack element to rack element. Wires/cables are routed to the desired location at the rear of the patch panel, i.e., in the bounded region defined by spaced rack elements. Patch cords are routed to the desired jack/port on the front face of the patch panel, e.g., from a raceway or the like. Thus, for cable management purposes, the patch cords are generally drawn toward one or the other side of the patch panel at the front of the rack system and, from there, routed to the desired component and/or network communication location.

More recently, manufacturers have introduced patch panels that include a pair of planar front faces that are joined to each other at an angle, e.g., at a center-point thereof. For example, Panduit Corporation (Tinley Park, Ill.) offers a line of angled patch panels under the tradename "DP6 Plus" that includes a pair of angled panels that support a plurality of ports. With reference to FIG. 1, a top view of a commercial angled patch panel product 10 (Panduit Corporation) is provided that depicts angled panels 20, 22 joined at apex 24. Of note, flanges 26, 28 are joined 20 to angled panels 20, 22, respectively. Flanges 26, 28 are substantially aligned with the front faces of angled panels 20, 22 and are angularly mounted with respect thereto. Flanges 26, 28 permit patch panel product 10 to be mounted with respect to a universal rack (not pictured), e.g., a conventional 19" rack.

Despite efforts to date, a need remains for improved angular patch panel designs that are configured to be mounted to a rack or console, facilitate cable management functions, and enhance space utilization at and around the rack/patch panel assembly.

SUMMARY OF THE DISCLOSURE

The present disclosure is directed to an angled patch panel that is configured to be mounted to a rack or console, facilitates cable management functions, and enhances space utilization at and around the rack/patch panel assembly. The angled patch panel of the present disclosure is configured for mounting to a rack or console and includes first and second patch panel elements that are angularly oriented with respect to each other. The transition from the first patch panel element to the second patch panel element is generally achieved in an apex region. The first and second patch panel elements generally include a front face that is integrally formed, although it is contemplated that distinct patch panel elements may be used in fabricating the front face of the angled patch panel of the present disclosure, such distinct patch panel elements being joined in the apex region through an appropriate structural connection.

According to the present disclosure, flange members are formed and/or positioned at each end thereof. Each of the flange members define a mounting face that includes mounting features for facilitating mounting of the angled patch panel relative to a rack or console. Such mounting features typically take the form of slots and/or apertures, although alternative mounting features may be employed. Each flange element also advantageously includes or defines an extension arm that is intermediate the mounting face and the patch panel element to which the flange element is mounted or from which the flange element extends. The extension arm is dimensioned to facilitate at least partial recessing of the angled patch panel relative to the rack/console when the angled patch panel is mounted thereto.

In an exemplary embodiment of the present disclosure, the flange elements are integrally formed with respect to the front faces of the patch panel elements. Thus, the front face of the first and second patch elements may be defined, at least in part, by a single structural element, e.g., an elongated steel plate. The apex region of the angled patch panel may be defined by forming an appropriate bend (or combination of bends) so as to define the desired angular relationship between the first and second patch panel elements, e.g., 10° to 20°. Moreover, the flange members may be defined by forming appropriate bends in the elongated structural element. Thus, with respect to each flange member, a first bend may be formed to define the extension arm, and a second bend may be formed to define the mounting face. In exemplary embodiments of the present disclosure, the extension arm is substantially perpendicular relative to the mounting face, whereas the extension arm and the associated front face of the patch panel element typically define an acute angle.

The disclosed angled patch panel typically includes a plurality of modular jacks or ports in the front face that are adapted to receive plugs, and associated punch down blocks at the rear of the angled patch panel. The number of ports associated with the disclosed angled patch panel may vary. Exemplary designs of the disclosed patch panel include twenty four and forty eight ports, respectively. In such embodiments, the ports are typically arranged in groups of six, with two (or four) sets of six ports mounted with respect to each angled patch panel element.

Accessory elements may be advantageously provided according to exemplary implementations of the disclosed angled patch panel. Thus, for example, a wire management bracket may be mounted with respect to rearwardly directed threaded studs associated with the respective patch panel elements. The wire management bracket may facilitate cable routing at the rear of the angled patch panel, i.e., within the rack or console. Cable ties may be employed to enhance cable management performance. In addition, mounting screws and lockwashers may be provided to facilitate mounting of the angled patch panel with respect to a rack/console. In circumstances where grounding is desired, an appropriate lockwasher may be selected, e.g., a lockwasher fabricated from phosphorous bronze. Distinct regions for labeling of the ports that are accessible at the front face of the angled patch panel may also be provided, as will be apparent to persons skilled in the art. Cable manager(s) may be mounted to the front face of one or both patch panel elements to further facilitate cable management functions associated with the disclosed angled patch panel assembly.

In use, the angled patch panel of the present disclosure facilitates cable management functions, while enhancing space utilization at and around the rack/patch panel assembly. Angling of the patch panel elements facilitates cable routing to the sides of the rack/console. The advantageous design of the disclosed flange members and the enhanced functionalities that result from the design of such flange members permit the patch panel elements to be substantially recessed relative to a rack/console. By recessing the patch panel elements relative to a rack/console, several advantages are realized: (i) reduced likelihood that debris or other undesirable elements will enter the region behind the patch, (ii) enhanced cable management functionality within the rack/console by positioning such activities more effectively within the interior of the rack/console, (iii) reduced region in front of the rack that is effected by cable management functionalities, and (iv) a cleaner, more uniform appearance is provided for patch panel/rack assemblies.

Additional advantageous features and functions associated with the disclosed angled patch panel and patch panel assembly will be readily apparent from the detailed description which follows, particularly when reviewed together with the drawings appended hereto.

BRIEF DESCRIPTION OF THE FIGURES

So that those having skill in the art to which the subject matter of the present disclosure appertains will have a better understanding of uses and implementations of the disclosed angled patch panel and angled patch panel assemblies, reference is made to the accompanying figures wherein.

DETAILED DESCRIPTION OF EXEMPLARY EMBODIMENT(S)

The present disclosure provides advantageous angled patch panels that are configured to be mounted to a rack or console, to facilitate cable management functions, and to enhance space utilization at and around the rack/patch panel assembly. The angled patch panels of the present disclosure may be dimensioned to function in cooperation with conventional rack/console structures, e.g., 19" and 23" racks. A plurality of the disclosed angled patch panels may be mounted with respect to a single rack/console, as will be readily apparent to persons skilled in the art.

Figure 1:
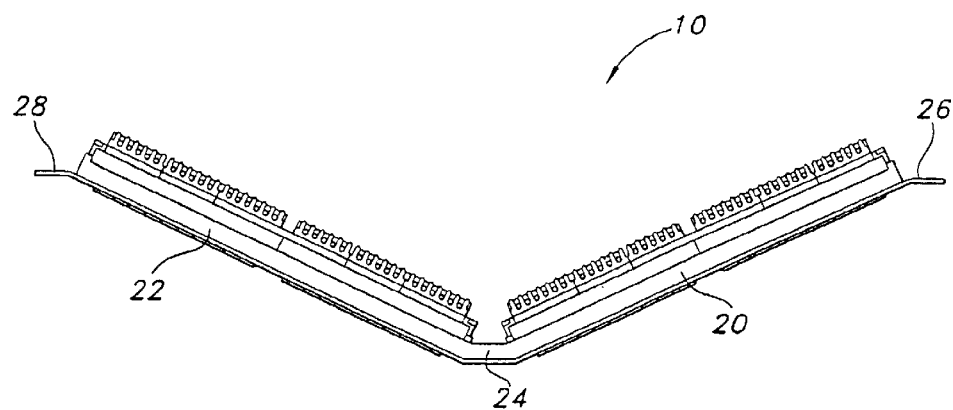
FIG. 1 is a top view of a prior art angled patch panel.
Figure 2:
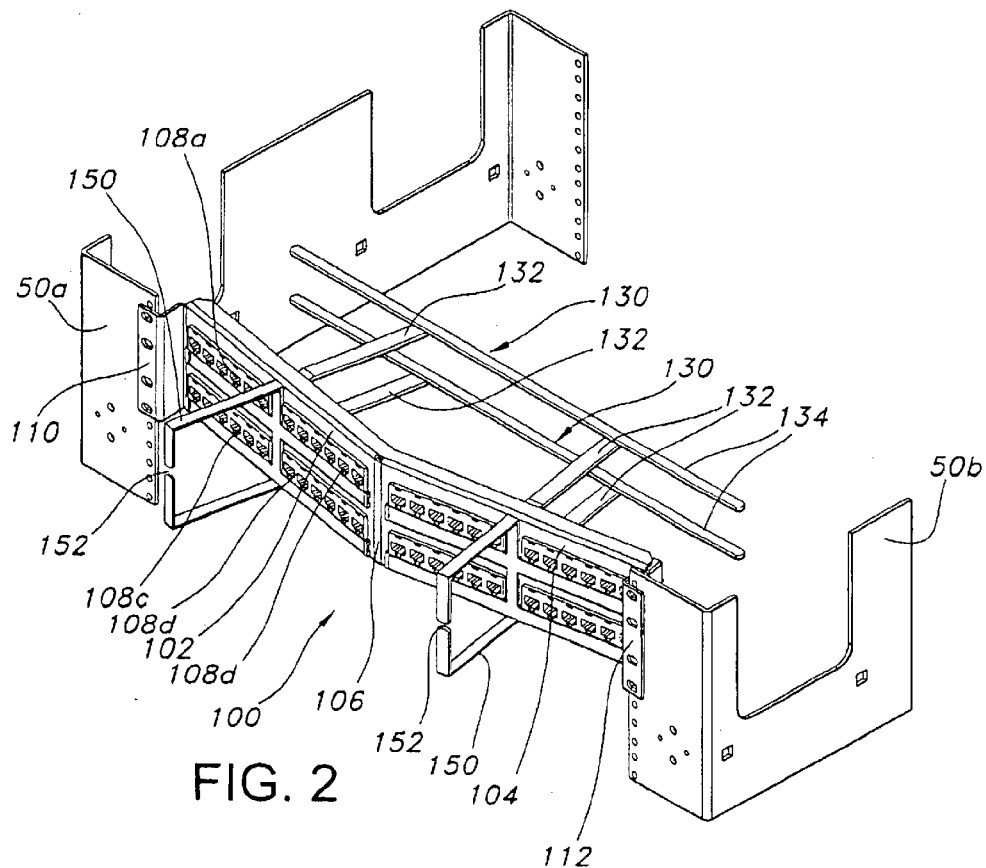
FIG. 2 is a perspective schematic view, partially cut-away, showing an exemplary patch panel assembly with accessory elements according to the present disclosure.
Figure 3:
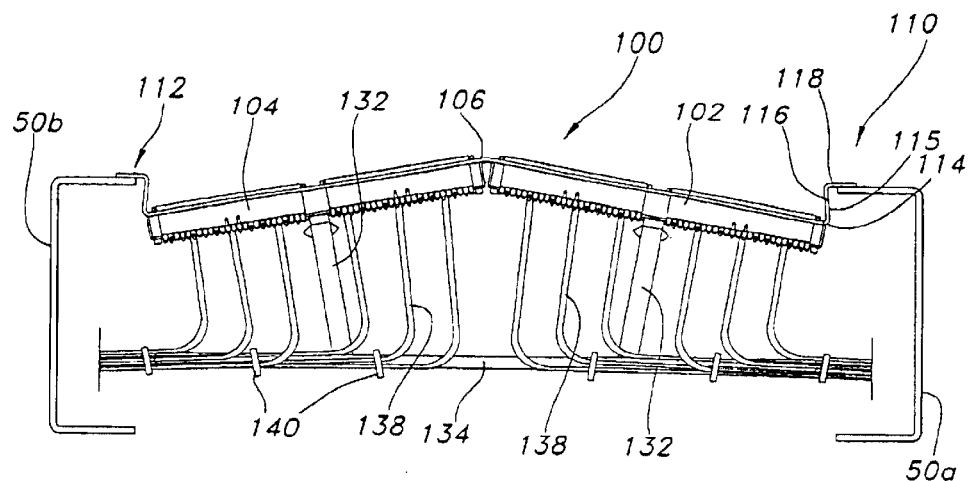
FIG. 3 is a top schematic view of the exemplary patch panel assembly with wires/cables mounted to the rear thereof.

With reference to FIGS. 2 and 3, an exemplary angled patch panel 100 according to the present disclosure is schematically depicted. Angled patch panel 100 is configured for mounting to a rack supports 50a, 50b, such that angled patch panel 100 is horizontally positioned between rack support 50a and rack support 50b. Angled patch panel 100 includes first patch panel element 102 and second patch panel element 104 that are angularly oriented with respect to each other. The transition from the first patch panel element 102 to the second patch panel element 104 occurs in apex region 106. Apex region 106 is generally defined at or near the midpoint of angled patch panel 100.

According to an exemplary embodiment of the present disclosure, first and second patch panel elements 102, 104 are formed, at least in part, by a single structural element, e.g., an elongated member that is fabricated from a sufficiently rigid material, e.g., steel. In the illustrated embodiment of FIGS. 2–3, patch panel elements 102, 104 are defined by an elongated steel member that includes a plurality of cut-outs to facilitate receipt/mounting of six port modules. Thus, with reference to FIG. 2, first patch panel element 102 includes four (4) modules 108a, 108b, 108c, 108d, each of which includes six (6) linearly aligned ports accessible from the front of angled patch panel 100. Similarly, second patch panel element 104 includes four (4) modules, each of which includes six (6) linearly aligned ports. In total, exemplary patch panel 100 includes forty eight (48) ports/jacks. The jacks associated with the jack modules of the present disclosure may be of conventional design with appropriate levels of performance, e.g., CAT 5E and/or CAT 6 performance levels.

Jack modules (e.g., jack modules 108a–108d) typically include a substantially rectangular projection face that defines, at least in part, the six linearly aligned jack openings associated with the module. The elongated member typically includes a plurality of substantially rectangular cut-outs that are dimensioned and configured to receive the projection faces associated with the jack modules. The jack modules also typically include a housing portion that is of larger dimension than the rectangular projection face, thereby allowing the module to be securely positioned relative to first/second patch panel elements, e.g., when introduced from the rear thereof. Mounting elements are typically provided at the rear of angled patch panel 100 to secure the jack modules relative to the elongated steel member.

In an exemplary embodiment of the present disclosure, threaded studs are perpendicularly mounted with respect to patch panel elements 102, 104, e.g., on either side of each rectangular cut-out, and are adapted to cooperate with one or more apertures formed at the edges of the jack modules. The threaded studs may be advantageously secured to the rear of the elongated member, e.g., by counter-sinking the screw head into an appropriately sized recess, welding, adhering or the like. Mounting brackets are typically fabricated from an appropriate plastic material and may be positioned in an interference position with respect to the jack modules in the assembly process. The mounting brackets are generally secured in place by threading nuts onto the upstanding studs that project from the rear of the patch panel elements, although alternative methods may be employed, as will be apparent to persons skilled in the art. Exemplary mounting brackets 220, 222, 224, 226, 228, 230 are depicted in the alternative twenty four (24) port embodiment of FIG. 4. Of note, the centrally positioned mounting brackets (e.g., brackets 222, 228 in FIG. 4) may include downwardly extending walls and/or block structure(s) (not pictured) that are configured and dimensioned to space and align adjacent jack modules.

Thus, exemplary jack modules according to the present disclosure include projection faces that extend through substantially rectangular openings formed in first and second patch panel elements, and such jack modules are secured in place by mounting brackets positioned at the rear of the angled patch panel. Of note, the rectangular opening(s) closest to apex region 106 are advantageously spaced away from the center point of the disclosed angled patch panel by a sufficient distance to ensure that inner-most wires secured to the rearwardly directed IDCs have an appropriate/acceptable bend radius.

The elongated member that defines (at least in part) first and second patch panel elements 102, 104 generally forms a bend in the apex region 106 that differentiates the first patch panel element 102 from the second patch panel element 104. The bend angle is selected based on the desired geometry of the angled patch panel, but typically ranges between about 10° and 20°. According to an exemplary embodiment of the present disclosure, the elongated member includes a further "rearward" bend at the base thereof, such rearward bend defining an elongated shelf that extends substantially from side-to-side relative to first and second patch panel elements 102, 104. To accommodate the bend(s) of the apex region, a cut is generally made in the shelf at or near the center-point thereof and an appropriate amount of material removed from the elongated element. Thereafter, a weld may be made to connect the shelf in the apex region. In those embodiments of the disclosed angled patch panel that include a shelf, the shelf generally enhances the stability/structural integrity of the disclosed angled patch panels and supplies a base to the angled patch panel, e.g., prior to mounting angled the patch panel relative to a rack/console.

As noted above, the apex region 106 of angled patch panel 100 maybe defined by forming one or more bends in the elongated members, e.g., an elongated steel member, so as to define the desired angular relationship between the first and second patch panel elements, e.g., 10° to 20°. Of note, the angle and overall structural relationship of the first and second patch panel elements is generally selected so as to facilitate access to the center-most connector locations at the rear of the angled patch panel, e.g., using a conventional punch-down tool. The bend(s) are generally radiused to facilitate manufacture and to provide a smooth transition to angled patch panel 100. Rather than bend(s), however, the apex region may be established through a joining of first and second patch panel elements in an angled manner, e.g., by incorporating an appropriate joining structure. Thus, the present disclosure is not limited to implementations wherein the first and second patch panel elements are formed from a single elongated member, but also extends to implementations wherein the first and second patch panel elements are defined by distinct structural members that are angularly joined in the apex region.

Exemplary embodiments of the present disclosure include an applique that is adhered to the front face of first and second patch panel elements. The applique generally includes preprinted indicia, e.g., port designations (see, e.g., FIGS. 7 and 8). The use of appliqué(s) on the front face of first and second patch panel elements facilitates manufacture and use of the disclosed angled patch panels. Inclusion of appropriate indicia on such appliqué(s) facilitates the interconnections that users desire to effect, while avoiding the potentially expensive and difficult process of printing or otherwise defining appropriate indicia directly on the patch panel elements.

The appliqué(s) are typically fabricated with appropriate rectangular openings (to match up with the openings formed in the patch panel elements) and advantageously extend substantially from side-to-side. Regions for mounting/adhering additional label-like information may also be provided according to the present disclosure, e.g., below the linearly aligned ports (see, e.g., label blocks 420 in FIGS. 7 and 8).

With further reference to FIGS. 2 and 3, angled patch panel 100 includes flange members 110, 112 that extend from first patch panel element 102 and second patch panel element 104, respectively. According to the present disclosure, flange members 110, 112 are formed and/or positioned at each end of angled patch panel 100. Each of the flange members 110, 112 define a mounting face that includes mounting features for facilitating mounting of the angled patch panel relative to a rack or console. Such mounting features typically take the form of slots and/or apertures, although alternative mounting features may be employed. Each flange element also advantageously includes or defines an extension arm that is intermediate the mounting face and the patch panel element to which the flange element is mounted or from which the flange element extends. The extension arm is dimensioned to facilitate at least partial recessing of the angled patch panel relative to the rack/console when the angled patch panel is mounted thereto.

Thus, as shown in FIGS. 2 and 3, flange members 110, 112 are advantageously defined by forming appropriate bends in the elongated member that defines (at least in part) first and second patch panel elements 102, 104). With particular reference to flange member 110, a first bend 114 may be formed to define the extension arm 115, and a second bend 116 may be formed to define the mounting face 118. As shown in FIG. 3, the extension arm 115 is substantially perpendicular to the mounting face 118, whereas the extension arm 115 and the associated front face of the first patch panel 102 typically define an acute angle, e.g., about 70° to 80°.

The extension arms defined as part of flange members 110, 112 (e.g., extension arm 115) is particularly significant for purposes of the present disclosure. The presence of extension arms as part of flange members 110, 112 permits the first and second patch panels 102, 104 to be substantially recessed relative to rack elements 50a, 50b. Thus, in an exemplary embodiment of the present disclosure, the first and second patch panels 102, 104 are about nine inches (9") in length, while the extension arms are approximately one inch (1") in length. In such embodiment, the apex region 106 of the angled patch panel 100 extends approximately ⅝ inches beyond the plane defined by mounting faces 118 of flange members 110, 112. Thus, the first and second patch panels 102, 104 are substantially recessed within the rack/console to which they are mounted. Refinements and/or adjustments in the degree to which the patch panels are recessed relative to the rack/console may be effected by adjusting the angular relationship of the first and second patch panels in the apex region and/or by adjusting the lengths of the extension arms of flange members 110, 112. For example, the extension arms associated with flange members may advantageously range in dimension from about 0.5 to about 1.5 inches, and more advantageously from about 0.75 inches to about 1.25 inches. Regardless of the precise geometric arrangement, however, the extension arms that are formed in the disclosed flange members advantageously facilitate recessing of the patch panel members to a desired degree relative to a rack/console.

Accessory elements may be advantageously mounted with respect to angled patch panel 100, e.g., to facilitate cable management functions associated therewith. Thus, for example, one or more wire management brackets 130 may be mounted to the rear of first and second patch panels 102, 104. Two wire management brackets are depicted in the forty eight (48) port angled patch panel embodiment of FIG. 2. An exemplary wire management bracket 130 includes a pair of L-shaped arms 132 and an elongated bar 134. The L-shaped arms 132 include a slot (see FIG. 4) to facilitate mounting of wire management bracket 130 relative to angled patch panel 100. Thus, in an exemplary embodiment of the present disclosure, the centrally positioned studs that are used, at least in part, to position mounting brackets (e.g., brackets 222, 228 in FIG. 4) relative to jack modules, may also be employed to secure cable management bracket 130 relative to angled patch panel 100. In such embodiment, wing nuts may be provided to secure the cable management bracket relative to the threaded studs, although alternative mounting mechanisms may be employed without departing from the present disclosure.

As shown in FIG. 3, wires/cables 138 are mounted to the rear of jack modules associated with the patch panel elements 102, 104 and are routed rearwardly toward elongated bar 134 of wire management bracket 130. The wires/cables 138 are bent outvardly along elongated bar 134 and are secured relative to elongated bar 134 by wire ties 140. Once routed to the side (left or right), the wires/cables may be advantageously routed to a desired location, as is well known in the art. Generally, it is desired to maintain the minimum cable bend radius to four times the outside cable diameter.

With further reference to FIG. 2, one or more cable manager(s) 150 may be advantageously mounted to the front face of patch panel elements 102, 104, e.g., betven aligned jack modules. Cable manager(s) 150 are substantially rectangular in configuration and include a mounting feature, e.g., an aperture, slot or threaded screw, that facilitates mounting relative to the front face of patch panel elements 102, 104. A gap 152 is defined in the region opposite the mounting feature to facilitate introduction/withdrawal of wires/cables therefrom.

Figure 4:
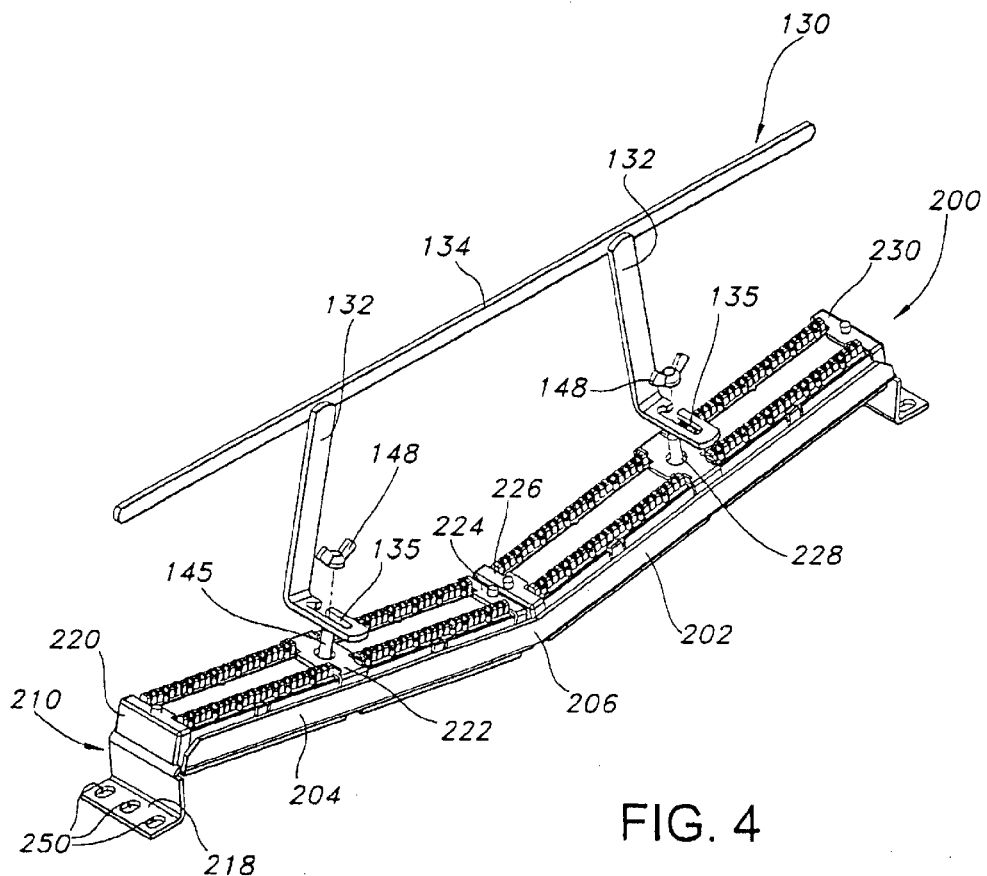
FIG. 4 is a side schematic view of a further exemplary patch panel and wire management bracket according to the present disclosure.

Turning to FIG. 4, an alternative angled patch panel 200 according to the present disclosure is schematically depicted. The structure of angled patch panel 200 is substantially identical to the structure of angled patch panel 100, except that patch panel 200 includes twenty four (24) ports rather than forty eight (48) ports. Thus, the overall height of angled patch panel 200 is less than that of patch panel 100. In exemplary embodiments of the present disclosure, patch panel 100 (which includes 48 ports) is typically about 3.5 inches in height, i.e., about two rack mounting units (RMUs), whereas patch panel 200 (which includes 24 ports) is typically about 1.75 inches in height, i.e., about one RMU.

As clearly shown in FIG. 4, L-shaped arms 132 include slots 135 that receive threaded studs 145. According to an exemplary embodiment of the present disclosure, slots 135 permit the wire management to be undertaken with the stud positioned in the slot at the furthest distance from the extended arm portion of the L-shaped arm, and then slid to the opposite end of the slot once wire management is complete. This repositioning permits efficient wire management activities. Once the wire management bracket 130 is in the desired location relative to angled patch panel 200, wing nuts 148 are tightened onto studs 145, thereby securing wire management bracket 130 relative to angled patch panel 200. The L-shaped arms 132 are angularly oriented relative to elongated bar 134, thereby accommodating the angular orientation of first patch panel element 202 relative to second patch panel element 204 and contributing greater stability to wire management bracket 130. As noted, wing nuts 148 may be used to secure the cable management bracket relative to the threaded studs, although alternative mounting mechanisms may be employed without departing from the present disclosure.

As also shown in FIG. 4, the mounting face 218 of flange member 210 includes three (3) apertures to facilitate mounting of angled patch panel 200 (24 port) relative to a rack/console. As shown in FIG. 2, however, angled patch panel 100 (48 port) includes four (4) apertures to facilitate mounting relative to a rack/console. The number of apertures and arrangement thereof of the mounting face of the flange members is not critical to the present disclosure, although it is generally desirable that the mounting feature cooperate with the features generally found on conventional racks, consoles and the like. Thus, the spacing of the mounting features, e.g., apertures, is generally selected to correspond to applicable industry standards, if any.

Figure 5:
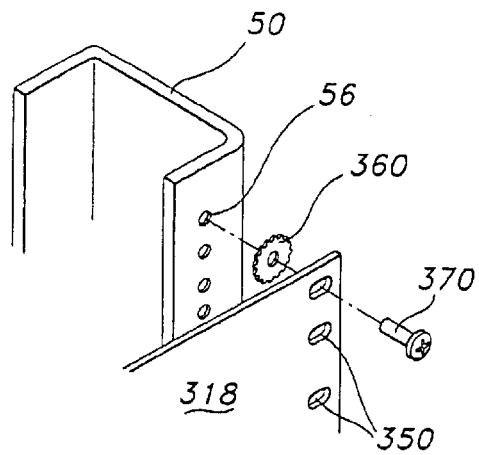
FIG. 5 is a perspective schematic view, partially cut-away, showing an exemplary patch panel being mounted with respect to a rack assembly, according to the present disclosure.

Turning to FIG. 5, a schematic view of the mounting of an exemplary angled patch panel to a rack/console is provided. Angled patch panel 300 includes a flange member that defines a mounting face 318 having a plurality of apertures 350. As shown in FIG. 5, the flange member is being mounted with respect to a rack 50 by passing a screw 370 through aperture 350, lockwasher 360 and into engagement with a mounting aperture 56 formed in rack 50. In circumstances where grounding is desired, an appropriate lockwasher 360 may be selected, e.g., a lockwasher fabricated from phosphorous bronze. Multiple screws 370 and lockwashers 360 may be employed, as will be readily apparent to persons skilled in the art. Once mounted to a rack/console, the angled patch panel and the rack/console together define an angled patch panel assembly.

Figure 6:
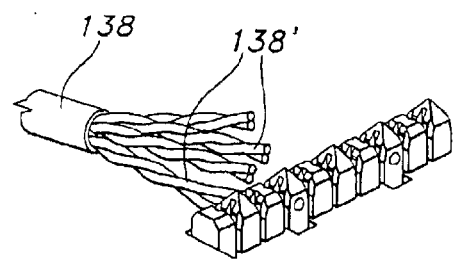
FIG. 6 is a schematic view of a multi-wire cable being mounted with respect to IDCs that extend from the rear of a patch panel according to an exemplary embodiment of the present disclosure.

With reference to FIG. 6, a schematic depiction of the interaction between individual wires 138' from wire/cable 138 and jack module 108a is provided. As is well known in the art, IDCs are positioned within a housing associated with the jack module, and separated wires 138' are inserted into an appropriate junction according to applicable wiring standards. Pair twists are generally maintained to within ½ inch of the point of termination for enhanced data performance.

Typically, cables are routed and terminated starting from the outside of the disclosed angled patch panel and working toward the center. Cables are typically routed from both sides of the rack, rather than from only one, to achieve optimal cable management functionality.

Figure 7:
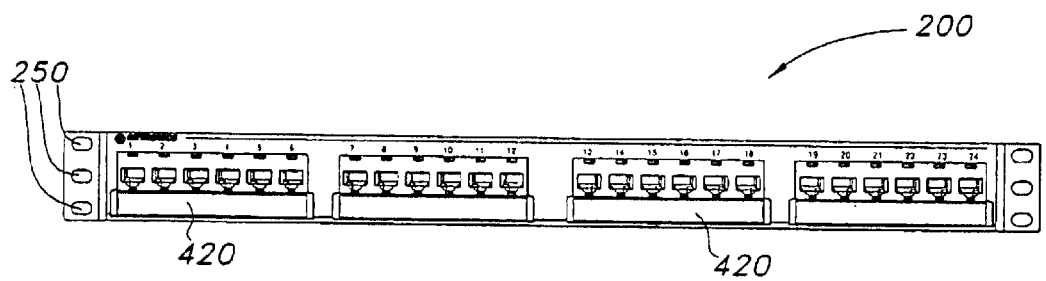
FIG. 7 is a front view of a twenty four (24) port patch panel according to an exemplary embodiment of the present disclosure.
Figure 8:
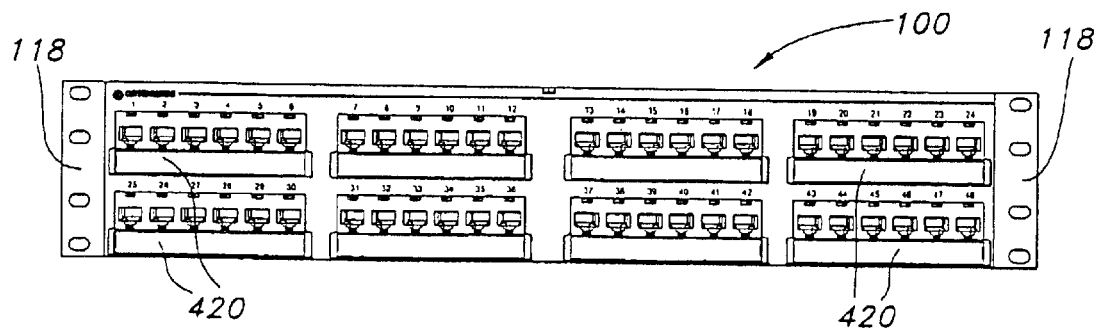
FIG. 8 is a front view of a forty eight (48) port patch panel according to a further exemplary embodiment of the present disclosure.

With reference to FIGS. 7 and 8, front views of angled patch panels 200 and 100 are schematically depicted, respectively. In both cases, the ports are advantageously numbered from 1–24 from left-to-right. In the case of angled patch panel 100, the lower ports are numbered from 25–48 from left-to-right. Such numbering is typically accomplished with an appliqué, as described above. Label blocks 420 are also provided for mounting/adhering additional label-like information below the linearly aligned ports.

In use, the angled patch panels of the present disclosure facilitate cable management functions, while enhancing space utilization at and around the rack/patch panel assembly. Angling of the patch panel elements facilitates cable routing to the sides of the rack/console. The advantageous design of the disclosed flange members and the enhanced functionalities that result from the design of such flange members permit the patch panel elements to be substantially recessed relative to a rack/console. By recessing the patch panel elements relative to a rack/console, several advantages are realized: (i) reduced likelihood that debris or other undesirable elements will enter the region behind the patch, (ii) enhanced cable management functionality within the rack/console by positioning such activities more effectively within the interior of the rack/console, (iii) reduced region in front of the rack that is effected by cable management functionalities, and (iv) a cleaner, more uniform appearance is provided for patch panel/rack assemblies.

Although the angled patch panels and angled patch panel assemblies of the present disclosure have been described with reference to exemplary embodiments thereof, the present disclosure is not limited to such exemplary embodiments. Rather, the present disclosure extends to and encompasses such modifications and/or enhancements that will be apparent to persons skilled in the art in view of the detailed description provided herein.

What is claimed is:

1. An angled patch panel comprising:
    (a) first and second patch panel elements that are joined in an apex region and are angularly oriented relative to each other; and
    (b) first and second flange members extending from said first and second patch panel elements, respectively;
    wherein each of said flange members includes a mounting face and an extension arm, and wherein said extension arm facilitates said first and second patch panel elements to be substantially recessed relative to a rack.

2. An angled patch panel according to claim 1, wherein said first and second patch panel elements are formed from a single elongated element.

3. An angled patch panel according to claim 2, wherein said single element is an elongated steel member.

4. An angled patch panel according to claim 1, wherein said first and second patch panel elements are angularly oriented relative to each other through at least one bend in said apex region.

5. An angled patch panel according to claim 1, wherein each of said first and second patch panel elements include at least one opening that is configured and dimensioned to receive a jack module, and wherein said angled patch panel further comprises a jack module positioned in each of said at least one openings.

6. An angled patch panel according to claim 5, wherein each of said jack modules is retained in position with respect to said first or second patch panel by at least one mounting bracket.

7. An angled patch panel according to claim 5, wherein each of said jack modules includes six linearly aligned ports.

8. An angled patch panel according to claim 1, wherein said first and second patch panel are angularly oriented at an angle of between about 10° and 20°.

9. An angled patch panel according to claim 1, further comprising an appliqué adhered to said first and second patch panels, said appliqué including indicia printed thereon.

10. An angled patch panel according to claim 1, wherein said first and second flange members are integrally formed with respect to said first and second patch panel elements.

11. An angled patch panel according to claim 1, wherein each of said mounting face and extension arm is formed from a unitary structure through a pair of bends.

12. An angled patch panel according to claim 1, wherein each of said mounting faces includes a plurality of apertures configured and dimensioned for mounting said angled patch panel with respect to a rack or console.

13. An angled patch panel according to claim 1, wherein each of said extension arms has a length of about 0.5 inches to about 1.5 inches.

14. An angled patch panel according to claim 1, further comprising at least one wire management bracket mounted with respect to rear faces of said first and second patch panel elements.

15. An angled patch panel according to claim 1, further comprising at least one cable manager mounted with respect to a front face of said first patch panel element.

16. An angled patch panel assembly, comprising:
    (a) a rack that includes first and second spaced rack support elements;
    (b) an angled patch panel mounted to said first and second spaced rack support elements, said angled patch panel including:
        (i) first and second patch panel elements that are joined in an apex region and are angularly oriented relative to each other; and
        (ii) first and second flange members extending from said first and second patch panel elements, respectively;
    wherein each of said flange members includes a mounting face and an extension arm, and wherein said extension arm facilitates said first and second patch panel elements to be substantially recessed relative to said rack when said angled patch panel is mounted to said first and second rack support elements.

17. An angled patch panel assembly according to claim 16, wherein each of said extension arms has a length of about 0.5 inches to about 1.5 inches.

18. An angled patch panel assembly according to claim 16, wherein each of said first and second patch panel elements include at least one opening that is configured and dimensioned to receive a jack module, and wherein said angled patch panel further comprises a jack module positioned in each of said at least one openings.

19. An angled patch panel assembly according to claim 16, further comprising at least one wire management bracket mounted with respect to rear faces of said first and second patch panel elements.

20. An angled patch panel assembly according to claim 16, further comprising at least one cable manager mounted with respect to a front face of said first patch panel element.

* * * * *

UNITED STATES PATENT AND TRADEMARK OFFICE
CERTIFICATE OF CORRECTION

PATENT NO. : 6,971,909 B2 Page 1 of 1
DATED : December 6, 2005
INVENTOR(S) : Stewart A. Levesque and Lars R. Larsen It is certified that error appears in the above-identified patent and that said Letters Patent is hereby corrected as shown below:

<u>Column 5,</u>
Line 15, should read -- although alternative securement methods may be emplooyed, as will be --.

<u>Column 6,</u>
Line 54, should read -- first and second patch panel elements 102, 104. With --.

<u>Column 7,</u>
Line 49, should read -- 138 are bent outwardly along elongated bar 134 and are --.
Line 58, should read -- face of patch panel elements 102, 104, e.g., between aligned --.

Signed and Sealed this

Twenty-eighth Day of March, 2006

JON W. DUDAS
*Director of the United States Patent and Trademark Office*